Aug. 1, 1944.   D. E. PERRY   2,354,967
LINE BLIND
Filed July 27, 1942   2 Sheets-Sheet 1
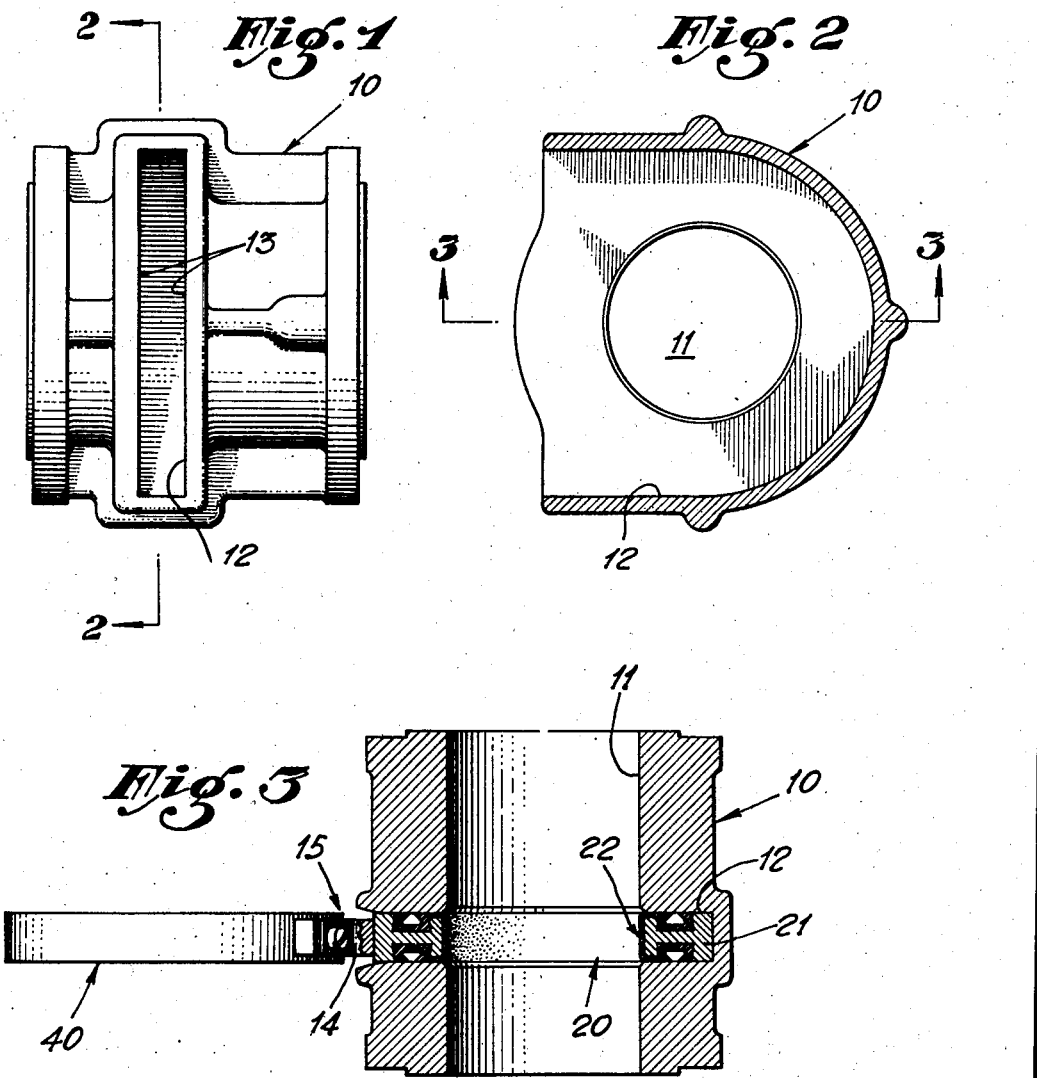
DONALD E. PERRY,
INVENTOR.
BY Robert M. McManigal
ATTORNEY.

Aug. 1, 1944.                D. E. PERRY                2,354,967
                              LINE BLIND
                      Filed July 27, 1942         2 Sheets-Sheet 2
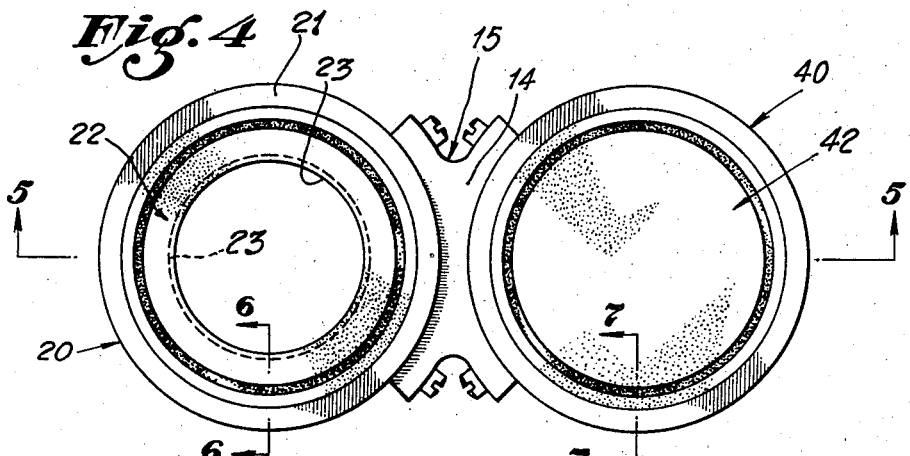
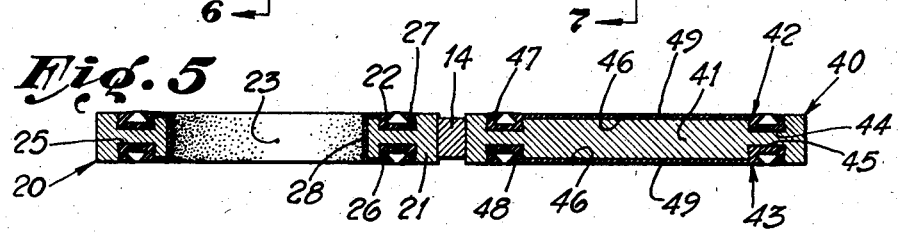
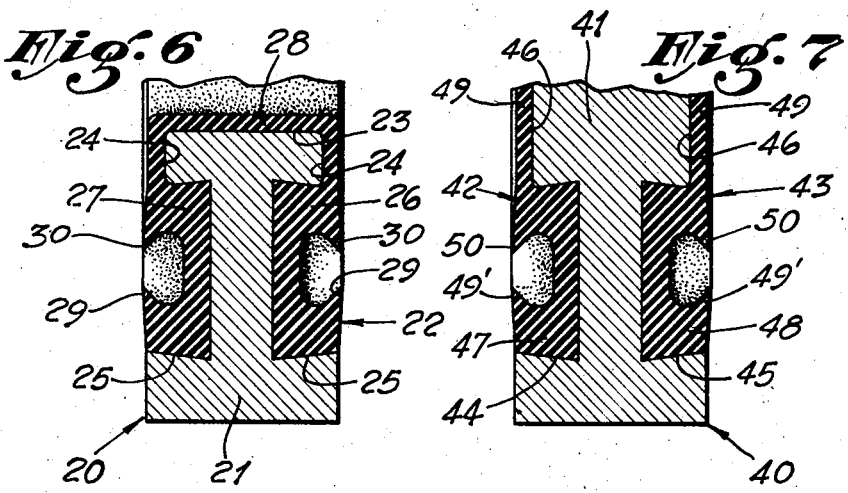
DONALD E. PERRY,
INVENTOR.
BY Robert M. McManigal
ATTORNEY.

Patented Aug. 1, 1944

2,354,967

UNITED STATES PATENT OFFICE 2,354,967

LINE BLIND

Donald E. Perry, Compton, Calif., assignor to MacClatchie Manufacturing Company of California, Compton, Calif., a corporation of California Application July 27, 1942, Serial No. 452,537

7 Claims. (Cl. 251—159)

My invention relates to new and useful improvements in line blinds.

The line blind has been generally used as a closing means for fluid carrying pipe lines in which a positive closing device is desired. In lines of this type the ordinary gate valve is not satisfactory because of the danger of slight leakage and because small leaks might pass undetected.

The so-called line blind, as used to completely blank off pipe lines, in its ordinary form consists of a flat metal plate bolted between two flanges and sealed by thin rings of packing. Because of the labor time involved in bolting and unbolting these flanges in installing or removing the blind, various devices have been invented which mechanically hold the blind in place or which mechanically hold some type of sealing means against the blind. The chief disadvantages of these blinds are that they are of relatively expensive construction, that they are mechanically actuated, and that they need constant adjustment and replacement of worn parts.

The object of my invention is to provide a line blind in which there are no longitudinally movable or adjustable parts.

Another object of my invention is to provide a line blind in which the fluid controlling means is adapted to be inserted in a slot in the body of the line blind, held in slight frictional engagement in said slot, and provided with flexible sealing lips formed in such a manner that a difference in pressure between the inside and outside of the line blind will expand the sealing lips tightly against the adjacent surfaces of the body, thus effecting a seal which becomes stronger as the difference in pressure increases.

Another object of my invention is to provide a line blind in which the fluid controlling means is provided with a sealing member which is so formed that no fluid within the line can penetrate beneath or around the edges of said sealing member.

Another object of my invention is to provide a line blind in which the fluid controlling means is adapted to be inserted in a slot in the body of the line blind, held in frictional engagement in said slot, and provided with means so that it will be automatically sealed off with respect to the adjacent surfaces in the line blind with only a slight difference in pressure between the inside and outside of the line blind.

Another object of my invention is to provide a line blind which is easy to manufacture and easy to operate.

My invention has other objects which will be evident from a study of the following specification read in connection with the accompanying drawings, in which a preferred form of my invention is shown for illustrative purposes only.

Referring to the drawings:

Figure 1 is a plan view of the body of a line blind embodying the features of my invention without the fluid controlling means in place in the line blind.

Figure 2 is a view taken on the line 2—2 of Figure 1.

Figure 3 is a view taken on the line 3—3 of Figure 2, with the plate which allows for flow through the line blind inserted in the slot.

Figure 4 is a plan view of a spectacle embodying the features of my invention.

Figure 5 is a view taken on the line 5—5 of Figure 4.

Figure 6 is a section taken on the line 6—6 of Figure 4.

Figure 7 is a section taken on the line 7—7 of Figure 4.

Referring to the drawings, the numeral 10 indicates a body, usually an integral casting, the ends of which are usually provided with means so that the body can be connected to pipes and the like. A fluid passage 11, preferably cylindrical, extends through the body 10. The body 10 has a vertical or transverse slot 12, the sides 13 of which, i. e. the adjacent surfaces, are machined. The slot 12 is adapted to receive one or the other of flow controlling members 20, 40. The flow controlling members 20, 40, may be connected together by a connecting member 14 to form a spectacle 15, as shown in Figure 4, if desired. However, the flow controlling members 20, 40, need not be connected together, in which event, they are usually provided with handles or other means to facilitate ease of handling.

When flow through the line is desired, the flow controlling member 20 is inserted in the slot 12. The flow controlling member 20 comprises a flat metal plate 21 of circular form and a resilient sealing member 22. The plate 21 is provided with a circular opening or orifice 23 which is preferably of the same size as the passage 11, circular undercut portions 24, and with circular grooves 25 on both of its faces to position the sealing member 22. The sealing member 22, usually formed of rubber and preferably molded, is made of two parallel rings or flanges 26 and 27 of circular form which are connected together by a connecting strip 28. One of the flanges is adapted to be inserted in one of the grooves 25, the strip 28 is inserted in the opening 23 and the other flange is then inserted in the other groove 25. The connecting strip 28 prevents any fluid in the passage 11 from penetrating behind the rings 26 and 27.

The thickness of the flow controlling member 20 with relation to the width of the slot 12 is such that it is held in slight frictional contact with the machined surfaces 13.

The rings 26 and 27 are provided with two flexible sealing lips 29 and 30, one facing inward and the other outward. These lips which are usually molded are formed in such a manner that a difference in pressure between the inside and the outside of the body will expand the lips tightly against the machined surfaces 13 of the body 10, thus effecting a seal which becomes stronger as the difference in pressure increases.

When a complete shut-off is desired, the flow controlling member 40 is inserted in the slot 12. The flow controlling member 40 comprises a flat metal plate 41 of circular form and resilient sealing members 42 and 43. The plate 41 is provided with circular grooves 44 and 45 on both of its faces in order to position the sealing members 42 and 43 respectively. The portions of the plate 41 inside of the grooves 44 and 45 are preferably undercut, as indicated at 46.

The sealing members 42 and 43, usually formed of rubber and preferably molded are flat, of circular form, and have outer rings or flanges 47 and 48 which are adapted to be inserted in grooves 44 and 45 respectively. The center disc portions 49 prevent any fluid in the passage 11 from penetrating behind the rings 47 and 48.

The thickness of the flow controlling member 40 with relation to the width of the slot 12 is such that it is held in slight frictional contact with the machined surfaces 13.

The rings 47 and 48 are provided with two flexible sealing lips 49 and 50, one facing inward and the other outward. These lips which are usually molded are formed in such a manner that a difference in pressure between the inside and the outside of the body will expand the lips tightly against the machined surfaces 13 of the body 10, thus effecting a seal which becomes stronger as the difference in pressure increases.

The advantages of the blind of my invention are: (1) leak-proof operation under any pressure; this is due to the fact that there is a slight friction seal between the sealing lips and the machined adjacent surfaces, either pressure or vacuum within the line will cause the sealing lips to seal off tightly, and no fluid in the line can penetrate beneath the rings of the sealing members because of the connecting members between the rings of the sealing members; (2) more economical operation and maintenance; this is due to the fact that the line blind has no longitudinally movable parts and no adjustments need to be made, because the fluid seal is automatically effected, and (3) ease of manufacture, due to the simple design.

From the foregoing description taken in connection with the accompanying drawings the uses, advantages, and operation of the line blind of my invention will be readily understood by those skilled in the art to which the invention appertains. While I have described the principle of operation, together with the form of my invention which I now consider to be the best embodiment thereof, I desire to have it understood that the form shown is merely illustrative and that the invention is not to be limited to the details disclosed herein, but is to be accorded the full scope of the appended claims.

I claim:

1. A line blind comprising a body having a fluid passage, a slot in said body perpendicular to said passage, and a flow controlling member in said slot, said flow controlling member comprising an annular plate having annular grooves on each side thereof and an annular sealing member having rings adapted to be inserted in said grooves and having annular portions connecting said rings whereby fluid is prevented from penetrating behind said sealing member.

2. A line blind comprising a body having a fluid passage, a slot in said body perpendicular to said passage, and a flow controlling member in said slot, said flow controlling member comprising an annular plate having annular grooves on each side thereof and an annular sealing member having rings adapted to be inserted in said grooves and having annular portions connecting said rings whereby fluid is prevented from penetrating behind said sealing member, said rings having flexible lips adapted to provide an automatic fluid seal between said sealing member and the surfaces of said slot.

3. A line blind comprising a body having a fluid passage, a slot in said body perpendicular to said passage, and a flow controlling member in said slot, said flow controlling member comprising an annular plate having an annular groove on each side thereof and an orifice, and sealing members having rings adapted to be inserted in said grooves and disc-shaped portions within said rings whereby fluid is prevented from penetrating behind said sealing members.

4. A line blind comprising a body having a fluid passage, a slot in said body perpendicular to said passage, and a flow controlling member in said slot, said flow controlling member comprising an annular plate having an annular groove on each side thereof and an orifice, and sealing members having rings adapted to be inserted in said grooves and thin members covering the inner portions of said rings whereby fluid is prevented from penetrating behind said sealing members.

5. As a new article of manufacture, a sealing member comprising a disc-shaped member terminating in an enlarged annular portion, said enlarged portion having flexible lips adapted to provide an automatic fluid seal between said sealing member and an adjacent surface.

6. As a new article of manufacture, a sealing member comprising an annular portion having an enlarged annular portion at each of its ends and an opening in its center, said enlarged portions having flexible lips adapted to provide automatic fluid seals between said sealing member and adjacent surfaces.

7. A line blind comprising a body having a fluid passage, a slot in said body perpendicular to said passage, and a flow controlling member in said slot, said flow controlling member comprising an annular plate having an annular groove and a sealing member having a ring adapted to be inserted in said groove, and a thin member covering the inner portion of said ring whereby the fluid is prevented from penetrating behind said sealing member.

DONALD E. PERRY.